United States Patent
Krantz et al.

(10) Patent No.: US 8,788,715 B2
(45) Date of Patent: *Jul. 22, 2014

(54) NETWORK AND INTERFACE SELECTION ON A COMPUTING DEVICE CAPABLE OF ESTABLISHING CONNECTIONS VIA MULTIPLE NETWORK COMMUNICATIONS MEDIA

(75) Inventors: Anton Krantz, Kirkland, WA (US); Warren V. Barkley, Mill Creek, WA (US); Dan Knudson, Redmond, WA (US); Florin Teodorescu, Redmond, WA (US); Mohammad Shabbir Alam, Redmond, WA (US); Vivek Bhanu, Belleve, WA (US); Edwin A. Hernandez-Mondragon, Pasaje Miramontes (HN); Taroon Mandhana, Bellevue, WA (US); Timothy M. Moore, Bellevue, WA (US); Abhishek Abhishek, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

This patent is subject to a terminal disclaimer.

(21) Appl. No.: 13/181,363

(22) Filed: Jul. 12, 2011

(65) Prior Publication Data

US 2011/0282985 A1 Nov. 17, 2011

Related U.S. Application Data

(63) Continuation of application No. 10/693,655, filed on Oct. 24, 2003, now Pat. No. 7,996,505.

(51) Int. Cl.
*G06F 15/16* (2006.01)
*H04W 48/18* (2009.01)
*H04W 88/10* (2009.01)
*H04L 12/54* (2013.01)

(52) U.S. Cl.
CPC .............. *H04W 48/18* (2013.01); *H04W 88/10* (2013.01); *H04L 12/5692* (2013.01)
USPC ......................................................... 709/249

(58) Field of Classification Search
CPC ... H04W 48/18; H04W 88/10; H04L 12/5692
USPC .................................................. 709/224, 249
See application file for complete search history.

(56) References Cited

U.S. PATENT DOCUMENTS

4,088,840 A 5/1978 Castet
5,517,677 A 5/1996 Moon
(Continued)

FOREIGN PATENT DOCUMENTS

CN 1735059 2/2006
EP 1119137 7/2001
(Continued)

OTHER PUBLICATIONS

"Advisory Action", U.S. Appl. No. 10/693,655, (Apr. 4, 2008),3 pages.
(Continued)

*Primary Examiner* — Kristie Shingles
(74) *Attorney, Agent, or Firm* — Andrew Sanders; Micky Minhas

(57) ABSTRACT

A system and method for carrying out network and interface selections across multiple media is disclosed. The disclosed system facilitates automated network interface configuration decision-making that spans a set of networks supporting communications via differing media. A set of media specific modules associated with differing communications media acquire network interface status/capabilities information. A rules engine thereafter applies a designated network selection rule(s) to the acquired network interface status/capabilities information, and any other appropriate parameters attributable to either an interface or network, to select one or more networks and interfaces with which to establish/maintain a connection.

20 Claims, 9 Drawing Sheets

(56) References Cited

U.S. PATENT DOCUMENTS

| | | |
|---|---|---|
| 5,809,419 A | 9/1998 | Schellinger et al. |
| 6,052,590 A | 4/2000 | Hicks et al. |
| 6,292,660 B1 | 9/2001 | Hartless et al. |
| 6,385,460 B1 | 5/2002 | Wan |
| 6,393,006 B1 | 5/2002 | Kajihara |
| 6,393,282 B1 | 5/2002 | Iimori |
| 6,567,377 B1 | 5/2003 | Vepa et al. |
| 6,681,259 B1 | 1/2004 | Lemilainen et al. |
| 6,801,777 B2 | 10/2004 | Rusch |
| 6,807,163 B1 | 10/2004 | Shi |
| 7,025,209 B2 | 4/2006 | Hawkins |
| 7,065,367 B2 | 6/2006 | Michaelis et al. |
| 7,065,376 B2 | 6/2006 | Wolman et al. |
| 7,110,783 B2 | 9/2006 | Bahl et al. |
| 7,120,129 B2 | 10/2006 | Ayyagari et al. |
| 7,180,876 B1 | 2/2007 | Henry et al. |
| 7,230,933 B2 | 6/2007 | Bahl et al. |
| 7,249,183 B1 | 7/2007 | Subbiah |
| 7,564,810 B2 | 7/2009 | Hernandez et al. |
| 7,996,505 B2 * | 8/2011 | Krantz et al. ............ 709/223 |
| 2001/0023446 A1 | 9/2001 | Balogh |
| 2002/0039892 A1 | 4/2002 | Lindell |
| 2002/0065941 A1 | 5/2002 | Kaan et al. |
| 2002/0082044 A1 | 6/2002 | Davenport |
| 2002/0176366 A1 | 11/2002 | Ayyagari et al. |
| 2002/0198980 A1 | 12/2002 | Najafi |
| 2003/0032451 A1 | 2/2003 | Hu |
| 2003/0058884 A1 | 3/2003 | Kallner et al. |
| 2003/0065816 A1 | 4/2003 | Dharmadhikari et al. |
| 2003/0100308 A1 | 5/2003 | Rusch |
| 2003/0210658 A1 | 11/2003 | Hernandez et al. |
| 2003/0212784 A1 | 11/2003 | Nguyen |
| 2004/0023634 A1 | 2/2004 | Jeong et al. |
| 2004/0077341 A1 | 4/2004 | Chandranmenon et al. |
| 2004/0116140 A1 | 6/2004 | Babbar et al. |
| 2004/0131078 A1 | 7/2004 | Gupta et al. |
| 2004/0185887 A1 | 9/2004 | Wolman et al. |
| 2004/0192301 A1 | 9/2004 | Shi |
| 2004/0205158 A1 | 10/2004 | Hsu |
| 2005/0009525 A1 | 1/2005 | Evslin |
| 2005/0037755 A1 | 2/2005 | Hind et al. |
| 2005/0090283 A1 | 4/2005 | Rodriquez |
| 2005/0091357 A1 | 4/2005 | Krantz et al. |
| 2005/0120119 A1 | 6/2005 | Bhanu et al. |
| 2005/0170832 A1 | 8/2005 | Cooper |
| 2005/0176420 A1 | 8/2005 | Graves et al. |
| 2005/0193150 A1 | 9/2005 | Buckley et al. |
| 2006/0084417 A1 | 4/2006 | Melpignano et al. |
| 2007/0076665 A1 | 4/2007 | Nair et al. |
| 2007/0223408 A1 | 9/2007 | Thielke et al. |

FOREIGN PATENT DOCUMENTS

| | | |
|---|---|---|
| EP | 1489788 | 12/2004 |
| EP | 1526682 | 4/2005 |
| JP | 06188885 | 7/1994 |
| JP | 2000216815 | 8/2000 |
| JP | 2003134151 | 5/2003 |
| JP | 2003259457 | 9/2003 |
| KR | 200267515 | 8/2002 |
| KR | 10200539529 | 4/2005 |
| WO | WO-0135578 | 5/2001 |
| WO | WO-0135585 | 5/2001 |
| WO | WO-0163946 | 8/2001 |
| WO | WO-0241580 | 5/2002 |
| WO | WO-03047177 | 6/2003 |
| WO | WO-2004031488 | 4/2004 |

OTHER PUBLICATIONS

"European Search Report", European Application No. 04019515, (Jan. 25, 2006),2 pages.

"Final Office Action", U.S. Appl. No. 10/693,655, (Nov. 27, 2007),13 pages.

"Final Office Action", U.S. Appl. No. 10/693,655, (Feb. 3, 2009),19 pages.

"Final Office Action", U.S. Appl. No. 10/693,655, (May 26, 2010),24 pages.

"Final Office Action", European Application No. 04019515.8, (Nov. 9, 2007),20 pages.

"Foreign Office Action", Chinese Application No. 200410088276.6, (May 9, 2008),21 pages.

"Foreign Office Action", Chinese Application No. 200410088276.6, (Apr. 24, 2009),15 pages.

"Foreign Office Action", European Application No. 04019515.8, (Dec. 29, 2006),19 pages.

"Foreign Office Action", European Application No. 04019515.8, (Aug. 1, 2007),4 pages.

"Foreign Office Action", European Application No. 04019515.8, (Nov. 9, 2007),20 pages.

"Non Final Office Action", U.S. Appl. No. 10/693,655, (Jun. 22, 2007),12 pages.

"Non Final Office Action", U.S. Appl. No. 10/693,655, (Aug. 19, 2009),23 pages.

"Non Final Office Action", U.S. Appl. No. 10/693,655, (Aug. 20, 2008),15 pages.

"Non Final Office Action", U.S. Appl. No. 10/693,655, (Sep. 17, 2010),22 pages.

"Notice of Allowance", U.S. Appl. No. 10/693,655, (Apr. 1, 2011),9 pages.

"Foreign Office Action", Japanese Application No. 2004-278407, (Nov. 27, 2009), 6 pages.

"Foreign Office Action", Japanese Application No. 2004-278407, (Apr. 20, 2010), 2 pages.

"Foreign Office Action", Korean Application No. 10-2004-0070221, (Feb. 11, 2011), 7 pages.

"Foreign Office Action", Korean Application No. 10-2004-70221, (Apr. 25, 2011), 3 pages.

"Notice of Allowance", Chinese Application No. 200410088276.6, (Mar. 29, 2010), 4 pages.

\* cited by examiner

| Scenario | Scenario examples | Scenario Parameters |
|---|---|---|
| Indicate preference order of media | Prefer WLAN over WWAN, prefer fastest connection, prefer 802.11a over 802.11b | - link speed<br>- media type (wired over wireless)<br>- .11 type (a/b/g)<br>- cost (TBC) |
| Indicate preference order of network order across multiple media | Prefer corporate network over WISP | - SSID (WLAN)<br>- Provider & APN (WWAN) |
| Indicate preference order of network by location | Prefer WISP A over WISP B in US, vice-versa in Europe | - Location (home, work, physical location, etc.) |
| Indicate preference order of logical network. | Prefer corporate network over WISP A over WISP B. Network provider decides which physical network (WLAN or WWAN) to use based on XML provisioning | - XML provisioning files from wireless provider<br>- Business logic to allow dynamic network selection |
| Indicate preference based upon time/day | Prefer WWAN network provider A on weekdays and WWAN network provider B on weekends and evenings | - Day<br>- Time<br>- Media types (WWAN) |

FIG. 8

NETWORK AND INTERFACE SELECTION ON A COMPUTING DEVICE CAPABLE OF ESTABLISHING CONNECTIONS VIA MULTIPLE NETWORK COMMUNICATIONS MEDIA

RELATED APPLICATION

This is a continuation of and claims priority to U.S. patent application Ser. No. 10/693,655, filed on Oct. 24, 2003 now U.S. Pat. No. 7,996,505, the disclosure of which is incorporated by reference.

BACKGROUND

Wireless networking has opened up a variety of doors to network connectivity. Today, through a combination of networking software and hardware, users are able to access network resources from virtually any location. In fact, in many instances users are able to select from a variety of communication media at any point in time. A communication medium, as used herein, refers to the physical as well as logical (protocol) means by which a user's computer communicates over a network. Examples of communication media include: cellular wireless wide area networks, personal area networks (e.g., Bluetooth), wireless local area networks (e.g., 802.11 (a/b/g)), wired local area networks, and wired wide area networks. Simultaneous availability of multiple communication media arises, for example, within an office environment that supports wireless local area network, wired local area network, wireless wide area network, and wired wide area network connectivity.

The presence of multiple networks potentially reachable via a variety of technologies (e.g., wireless local area networks, wireless wide area networks, hardwired local and wide area networks, personal computer area networks, etc.) introduces a need for network selection capabilities on a network-connectable computing device. In known computing systems, in particular computer systems executing WINDOWS XP, automated network selection is currently based on an order of identified networks in a preference list for a particular communications media—wireless LAN. In the preference list-based automated selection approach, for each network, the sole question when considering a current list entry is, "Can the computing device currently connect to the identified network?" If the answer is yes, then a connection is established. If the answer is no, then the next entry within the preference list is used (until a network connection is established). However, the preference list approach provides a somewhat limited degree of flexibility in configuring a computing device to automatically connect to a network.

SUMMARY

Various embodiments comprise a framework and method for selecting a network and interface based upon selection rules and network interface capabilities information spanning multiple communication media. The framework includes a rules data store for maintaining network selection criteria. The criteria can take on a variety forms and support selection across potentially multiple media.

A media specific module interface facilitates acquiring network interface information associated with available network interfaces. The accumulated information potentially spans multiple communication media associated with a set of networks to which the computing system is capable of connecting via a set of network interfaces.

The network and interface selection framework also includes network selection logic. The network selection logic is applied to the accumulated information to designate one of the set of networks. Thus, the framework enables network and interface selection spanning multiple media.

The various embodiments are also directed to a method and computer-readable media for carrying out the functionality embodied in the above-summarized network and interface selection framework spanning multiple media types.

BRIEF DESCRIPTION OF THE DRAWINGS

While the appended claims set forth the features of various embodiments with particularity, the various embodiments, together with its objects and advantages, may be best understood from the following detailed description taken in conjunction with the accompanying drawings of which:

FIG. 8 is a table summarizing automated network interface selection and configuration scenarios based upon information provided to a rules engine involving multiple communication media;

DETAILED DESCRIPTION OF THE DRAWINGS

The illustrative network and interface selection architecture disclosed herein facilitates highly flexible automated network and interface selection decision-making in a multiple communication media environment. The network and interface selection architecture supports decision-making by a programmable network and interface selection rules engine. Furthermore, the criteria applied by the programmable rules engine to a particular network interface associated with a particular communication media is potentially based upon capability/policy/status/network resource information associated with other network interfaces utilizing alternative communication media.

By way of example, the rules engine selects a particular network interface and network from a set of network interfaces and networks associated with media specific modules encompassing multiple communication media, based on a set of selection rules including: network preference order, resources available on particular networks, speed of the connections to the networks via the particular media, etc. In an example embodiment, the rules applied by the rules engine are potentially specified by a variety of sources including users, network administrators (group policies), and network service providers. The rules are applied to network interface status/capabilities information provided by media specific modules associated with a variety of communications media (e.g., wireless LAN, wireless WAN, wireless PAN, wired LAN, wired WAN, etc.).

The rules engine facilitates universal network selections spanning multiple media supported by a set of network interfaces on the computing device. In the example embodiment, the rules engine receives status/capabilities information regarding each of a set of network interfaces associated with potentially multiple communication media. The rules engine executes network and interface selection decision-making according to the received information and network and interface selection rules spanning potentially multiple media. Based upon the network/interface selection results rendered during the decision-making, the rules engine initiates configuring a selected network interface by, for example, issuing configuration instructions to media specific modules associated with particular ones of the network interfaces affected by the network and interface selection results. The media specific modules in turn issue instructions to drivers associated with the affected network interfaces.

Figure 1:
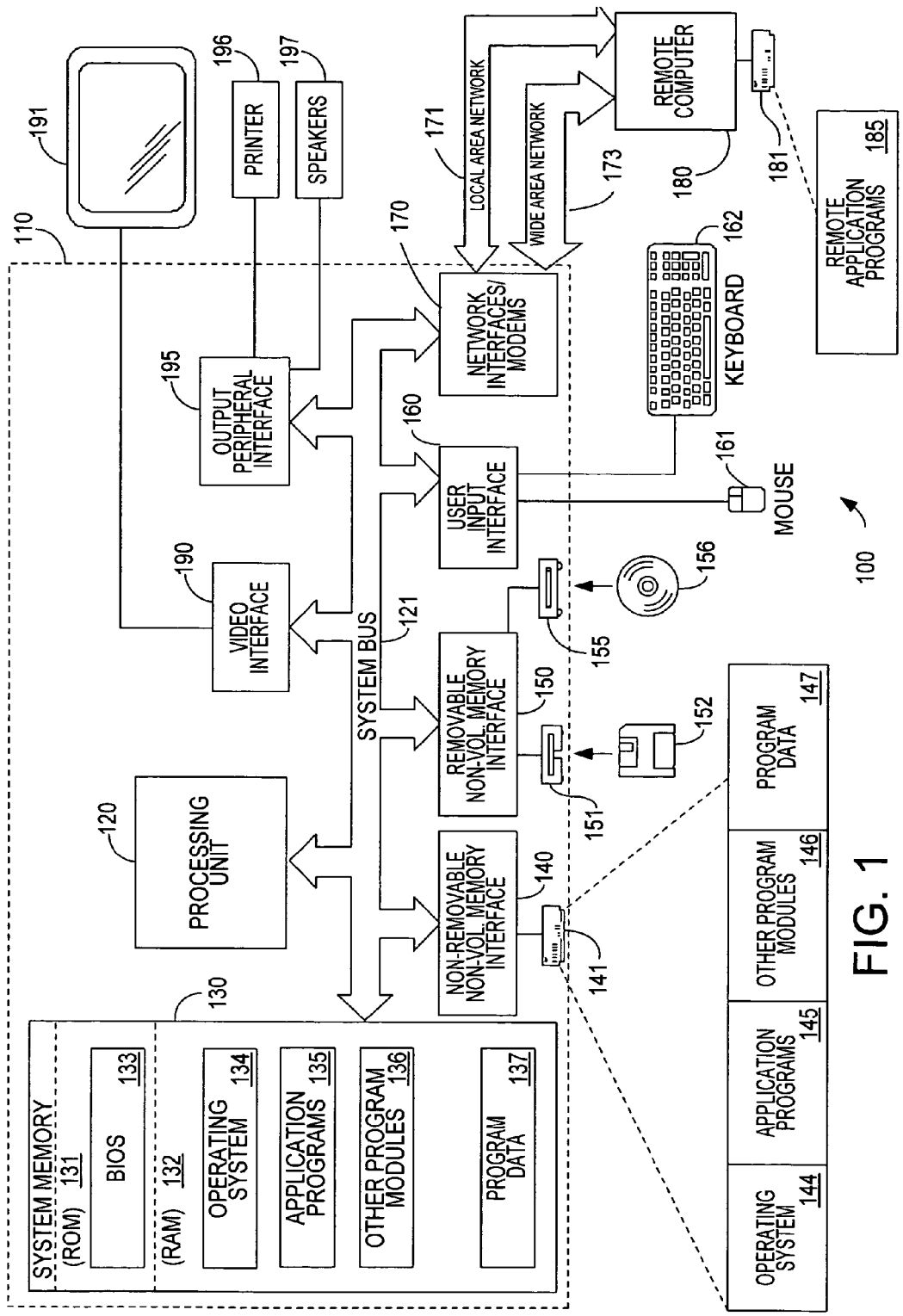
FIG. 1 is a simplified schematic illustrating an example architecture of a computing device for incorporating/carrying out an embodiment.

FIG. 1 illustratively depicts an example of a suitable operating environment 100 for a computing device (e.g., a notebook computer) used in an environment including one or more networks accessed via various differing communication media. The operating environment 100 is only one example of a suitable operating environment, and is not intended to suggest any limitation as to the scope of use or functionality of the various embodiments. Other well known computing systems, environments, and/or configurations that may be suitable for use with the various embodiments include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The various embodiments may be described in the general context of computer-executable instructions, such as program modules, being executed by a computer. Generally, program modules include routines, programs, objects, components, data structures, etc. that perform particular tasks or implement particular abstract data types. The various embodiments are potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an example system for implementing the various embodiments includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media such as wireless PAN, wireless LAN and wireless WAN media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through one or more wired/wireless network interfaces 170. Furthermore, the set of one or more wired/wireless network interfaces 170 support communications over the WAN 173, such as the Internet. While not shown in FIG. 1, computer 110 potentially includes an internal or external modem, connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are example and other means of establishing a communications link between the computers may be used.

Figure 2:
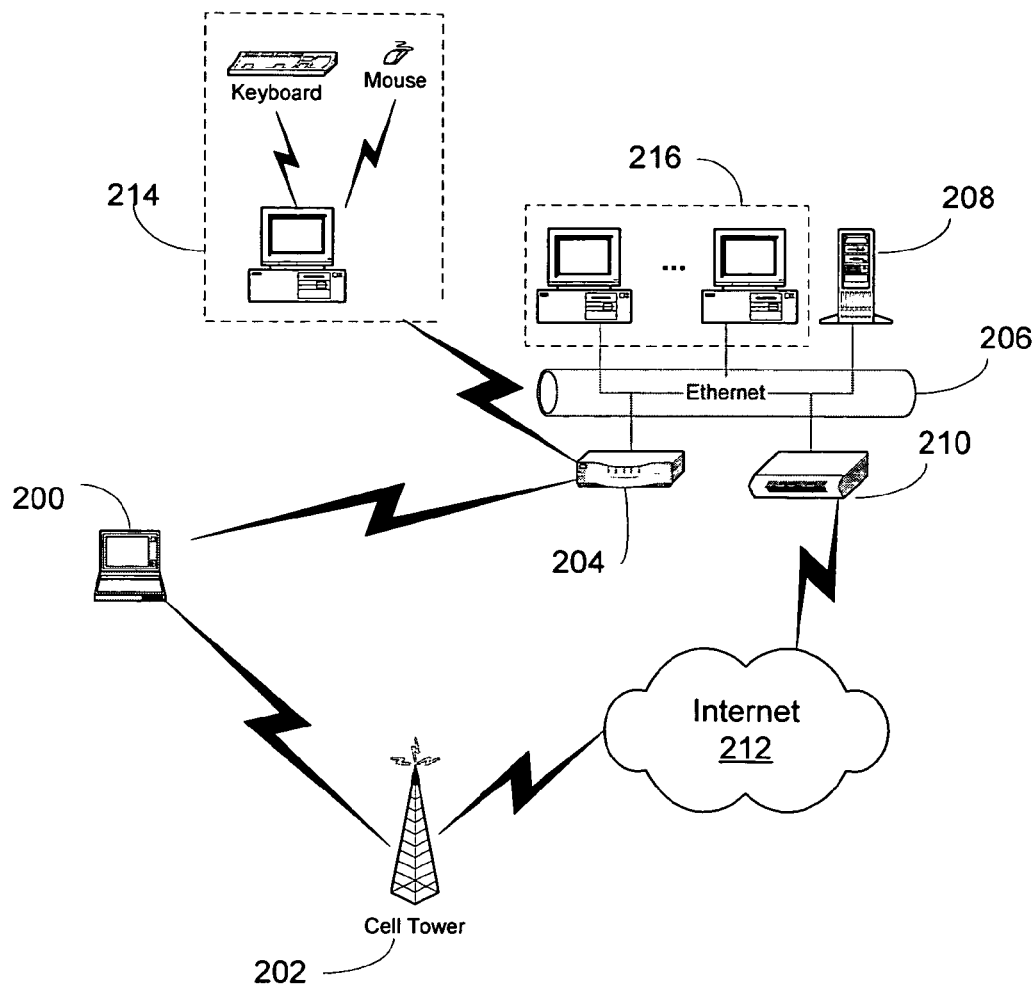
FIG. 2 is an example multiple network communication media arrangement including multiple network access points to which a mobile computing device potentially connects.

The various embodiments are potentially incorporated into mobile and non-mobile computing devices/machines used in a variety of dynamic networking environments. In such environments, one manner in which to communicate potentially changes as the set of available media changes, the quality of service on particular media changes, and/or the workload on various communication media changes. Turning to FIG. 2, a simple example of a wireless computing environment is depicted. In the illustrative environment, a notebook computer 200 includes multiple network interface cards (not specifically shown) facilitating communications over multiple communications media. In the particular example depicted in FIG. 2, the notebook computer 200 communicates with a cellular transmission tower 202 (via WWAN media) and a wireless transceiver 204 (via WLAN media) that is communicatively coupled to a local area network 206.

The wireless transceiver 204 (also referred to as a wireless access point, or WAP), provides access to a variety of resources on the LAN 206. For example, the wireless transceiver 204 provides access by the notebook computer 200 to directories/files maintained on a file server 208. The LAN 206 also contains a gateway/firewall/modem 210 providing access by users of the LAN 206, including the user of the notebook computer 200, to the Internet 212. The gateway/firewall/modem 210 also provides access by users of the Internet 212 to the resources on the LAN 206.

The user of the notebook computer 200, as a result of the multiple supported network media, is able to access the Internet 212 and the file server 208 (through the Internet 212) via multiple communication media. For example, utilizing a WWAN network interface, the notebook computer 200 is able to access the Internet 212 via a cellular network including the cellular transmission tower 202. Alternatively, the notebook computer 200 accesses resources on the LAN 206 via the wireless transceiver 204. The LAN 206 in the illustrative example is assumed to include network access and proxy servers that enable a properly authenticated user of the notebook computer 200 to access resources of the Internet 212 and the LAN 206 via either of the two illustratively depicted wireless network media. The capability of the notebook computer to access a same resource via multiple media introduces the potential for selection of a particular one of the wireless network media based upon current conditions, needs, preferences, etc. of the user of the notebook computer 200. For example, other users of the network (e.g., PC 214 connected via wireless transceiver 204 and hardwired PCs 216) compete for limited network bandwidth and/or degrade quality of communications via a particular one of multiple network media. Furthermore, the PC 214, due to its use of wireless user interface devices (a mouse and keyboard), may create signal interference that degrades other wireless communications. In such instances, a relatively static preference list may not select the best connection available for meeting the particular needs of the notebook 200's current user under the current networking environment conditions.

A rules/roaming (network and interface selection) engine, incorporated within the notebook computer 200 embodying the various embodiments, applies criteria to information pertaining to multiple supported network media interfaces to select one or more of the notebook computer 200's set of network interfaces and associated networks to carry out current networking needs of the notebook computer 200. The roaming engine supports automated network and interface selection decision-making for each of its multiple network interfaces based upon status/capabilities information supplied by multiple network interfaces. The roaming engine is capable of taking into account information relating to the current status/capabilities of other network/media combinations when selecting a currently preferred network and interface combination with which to establish a connection. In addition to a preference list, the roaming engine can base its network interface/network selection decisions upon: availability of particular resources, network speed (maximum/actual), day/time as well as any other desired factor that can be obtained by the roaming engine. Thus, the scope of information and breadth of factors (each encompassing potentially multiple media) that determine the notebook computer 200's multiple network interface configuration is significantly enhanced in comparison to preference lists that merely descend a list of network interfaces for a single medium (e.g., WLAN), ordered by preference, until an available network interface for establishing a desired connection is identified.

Figure 3:
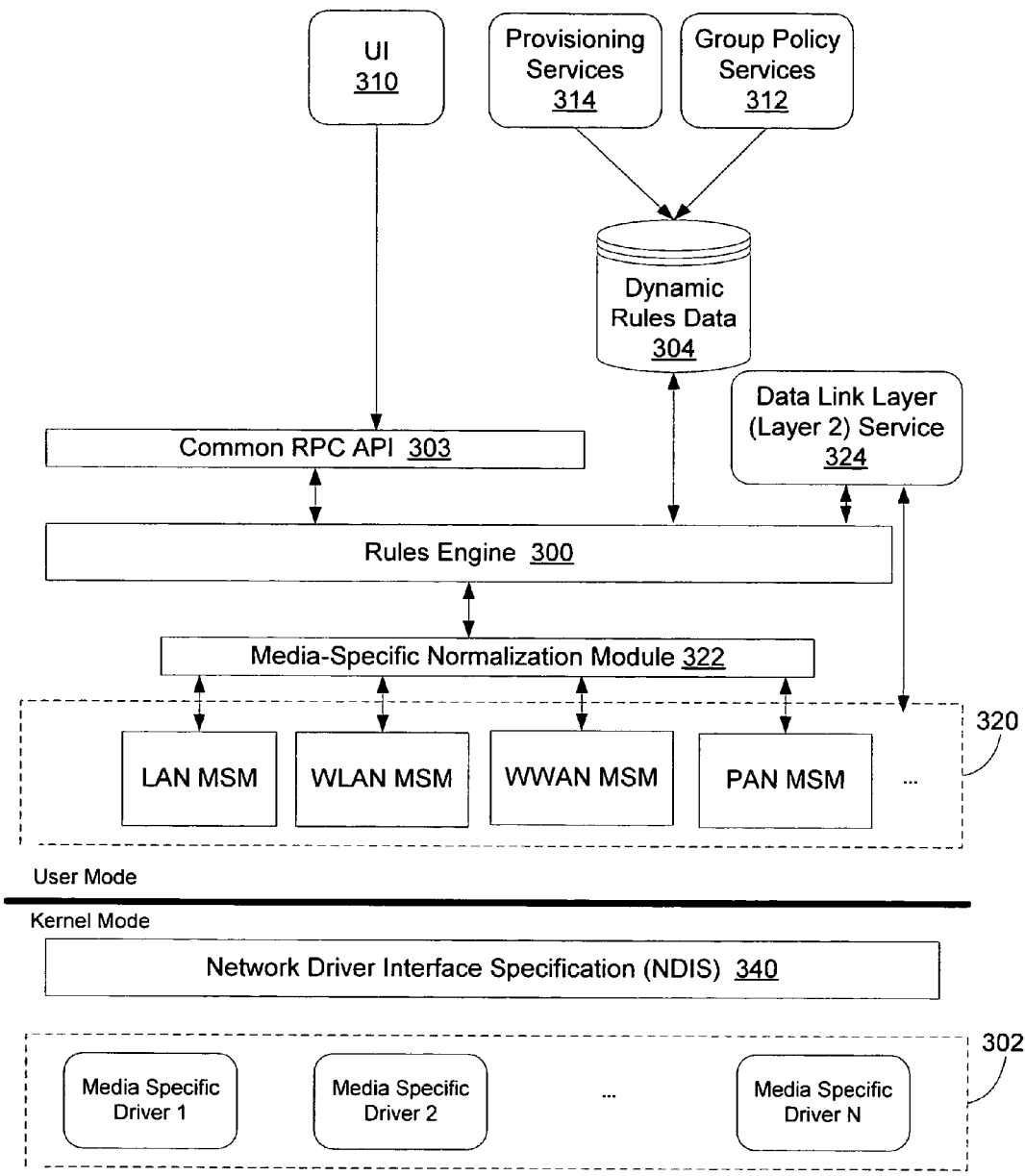
FIG. 3 is a schematic diagram identifying primary components in an automatic network selection framework within a computing in accordance with one or more embodiments.

Having described an example wireless networking environment wherein the various embodiments can be incorporated, attention is directed to FIG. 3 wherein an example automated network and interface selection architecture/framework is schematically depicted for incorporation into the notebook computer 200 (or any other computing device). The network and interface selection architecture is characterized by centralized automatic network and interface selection decision-making/control that is incorporated into a rules engine 300.

Beginning at the physical network interface level, in the illustrative architecture, a set of N media specific drivers 302 of various media types (e.g., Bluetooth, WWAN, WLAN—e.g., 802.11a/b/g, etc.) are associated with a set of N currently present network interface cards (NICs) installed on the computer 200. In the illustrative example, each of the media specific drivers 302 communicates with a corresponding NIC. Such communications include, among other things, status/capabilities information provided by the NICs. Such status/capabilities information is obtained, for example, by periodic scanning performed by the NICs upon request by the drivers 302. Upon request, status/capabilities information gathered by the N media specific drivers 302 is passed to the rules engine 300. The rules engine 300, as an aggregator/repository of all the status/capabilities information for all the supported NICs, stores the received status/capabilities information provided by the N media specific drivers 302 within a dynamic rules data store 304. In addition to scanning commands, the NICs also receive configuration commands from the drivers 302.

It is noted that, in an embodiment, the aforementioned network interface status/capabilities information and notifications are accessible by applications, provisioning services 314 (e.g., a wireless ISP), group-policy services 312, and a user interface 310 via a common remote procedure call API 303. By way of example, the common RPC API 303 includes callable methods/operations/functions for querying and changing, via the user interface 310 or group policy services 312: preference lists, visible lists, media configurations, device states, user authentication data, and network configuration. In an embodiment, the provisioning services 314 are limited to creating and updating network configurations that are passed down to the rules engine 300, and creating user authentication data through calls to the common RPC API 303. The above-described functions are described herein below with reference to FIG. 4.

The rules engine 300 accesses network and interface selection rules, potentially spanning multiple communication media, from the dynamic rules data store 304. The network and interface selection rules stored within the rules data store 304 can, as shown in FIG. 3, come from a variety of sources including: users (via user interface 310), network administrators (via group policy services 312), and network access provisioning services 314 (e.g., ISPs). In the illustrative embodiment, the UI 310 communicates rules through the Common RPC API 303. However, it is contemplated that any source of rules potentially submits rules through a variety of means including directly storing the rules directly within the rules data store as well as submitting the rules through a filtering entity such as the rules engine 300 or any other service supporting network device connections/configurations. In an embodiment, the rules engine 300 applies an order of precedence to sources of rules such that group policy services 312 rules are favored over UI 310 supplied rules. The rules specified by provisioning services 314 are given precedence over UI 310 supplied rules in the event that a UI 310 specifies such deference to the provisioning services 314.

The network and interface selection rules specify guidelines for selecting, for connection, a network and interface that utilizes a particular medium for data communication. Users and network administrators, for example, specify network and interface selection rules based upon one or more of the following factors/parameters:

1. Resource—Internet, corporate or home. Note that the Internet can be specified in finer granularity. Furthermore, a specific network may have multiple resources available.
2. Speed—Note that a network (interface) may support multiple link speeds, and furthermore the specified speed is the maximum rather than the actual connection speed (which may not be known until the connection is established).
3. Network provider service preference order (e.g. MSFT, WISP1, Cell1, etc.)
4. Cost—the rules engine enforces a user choice or alternatively lets a network provider make cost decisions. A network which is available via multiple media/network interfaces has different costs associated with each media. Furthermore, the costs potentially vary dynamically based on the usage model and are therefore periodically recalculated and refreshed.
5. Power consumption—if the computing device is running low on power, a decision process can be invoked to switch to a medium requiring a lower power consumption.
6. Location—Type of network and geographic location Network provisioning services are potentially available via a variety of media (e.g., WWAN, dial-up, DSL, etc.). A user, through selection rule type "3" recited above (network provider service preference order), potentially specifies a rule that defers selection of a particular media to provisioning service-supplied rules. In an illustrative embodiment, the provisioning service 314 specifies such rules in the form of XML files.

The rules engine 300 applies the set of selection rules to the accumulated status/capabilities information, associated with potentially multiple media, to make network and interface selection decisions for the N network interfaces. After making a selection regarding a particular one of the N network interface cards and a network to which the interface should connect, the rules engine 300 submits configuration instructions to a particular one of the N media specific drivers 302 that corresponds to the particular network interface. The media specific driver thereafter passes corresponding configuration instructions to the associated one of the N NICs.

In an embodiment, a set of media specific modules 320 support automatic network and interface selection relating to particular media types. In the illustrative example, the set of media specific modules 320 include: LAN module, a WLAN module, a WWAN module, and a personal area network (e.g., Bluetooth) module. The media specific modules 320 request capabilities/status information from the media specific drivers on behalf of the rules engine 300 and invoke scanning of network interfaces by associated media specific drivers of a supported media type. Upon request, the media specific modules pass the resulting acquired network information (e.g., presence, capabilities, status, etc.) to the rules engine 300.

After making a network/interface selection based upon the current set of rules and information, the rules engine passes network interface configuration commands to an appropriate one (or ones) of the media specific modules 320 to connect to a particular network or networks. In response to configuration instructions received from the rules engine 300, the media specific modules 320 initiate changes to connections associated with identified network interfaces via calls to associated media specific drivers. In the example embodiment, each one of the media specific modules 320 incorporates a state machine for carrying out the above-described functionality. An example set of states for the state machine are described herein below with reference to FIG. 6.

The media specific modules 320 are associated with two interfaces. The media specific modules 320 communicate with the rules engine via a generalized interface incorporated into a media specific normalization module 322. The normalization module 322, a layer that sits between the rules engine 300 and the media specific modules 320, facilitates standardizing communications between the rules engine 300 and media specific modules 320 of many types. The normalization module 322 facilitates: providing network driver capabilities/status information from the media specific modules 320 to the rules engine 300, and (2) specifying, by the rules engine 300, network interface configuration commands to the media specific drivers 302 via the media specific modules 320. Furthermore, the user-mode media specific modules 320 communicate with the media specific drivers 302, for example, according to (kernel mode) network driver interface specification (NDIS) 340. While the illustrative embodiment provides a media specific module for a particular medium type or class of media types, it is contemplated that alternative embodiments include composite media specific modules that support multiple, unrelated media types (e.g., a WWAN/WLAN media specific module). Furthermore, while the normalization module 322 is shown as a separate entity from both the rules engine 300 and the media specific modules 320, in alternative embodiments the functionality of the normalization module is incorporated into either the rules engine 300 or the media specific modules 320.

The set of media specific modules 320 is extensible and the individual modules are loaded and unloaded as needed to accommodate installed network interfaces/drivers. In an embodiment, the rules engine 300 registers with a notification service provided by a data link layer (OSI layer two) module 324 that monitors installation/removal of devices from a computing device. In a particular embodiment such notifications are carried out through a callback routine registered by the rules engine 300 with the notification service of the data link layer module 324. Thereafter, upon receiving a notification from the notification service that a new network interface/device has been installed, a determination is made by the rules engine 300 whether to load a media specific module to handle a media type of the new network interface (e.g., the network interface is the first for the particular media type). If needed, the appropriate media specific module is loaded by the data link layer module 324 upon request by the rules engine 300, and a reference to a set of function pointers (e.g., an interface table) is provided to the rules engine 300 to facilitate calling normalization module 322 functionality associated with the newly installed media specific module. Thereafter, the rules engine 300 acquires a handle for referencing the media specific module to initiate configuration operations (e.g., scan, connect, disconnect, etc.) on a media specific driver associated with the new network interface. Conversely, upon receiving notification that a network interface is removed, the handles opened on the device are disconnected/closed. If all sessions and handles on the media specific module, which can support multiple interfaces, have been closed, then the number of network interfaces is determined. If no network interfaces remain, then an unload test is carried out (potentially delaying the removal for a period of time) prior to initiating unloading the media specific module.

Loading/unloading media specific modules can be managed in a variety of ways by a variety of management entities. In an embodiment, the loading and unloading of individual ones of the media specific modules 320 is performed by the data link layer services module 324 that is responsible for loading and managing the status of both the media specific modules 320 as well as the rules engine 300. Extensibility is supported through registration of additional media specific modules supporting particular identified media-types. However, such loading and unloading of program modules can occur in any of a variety of ways, by a variety of entities in accordance with various embodiments.

In summary, the automatic configuration architecture described herein above with reference to FIG. 3 provides an extensible, highly flexible infrastructure for automatically selecting one or more of a set of network interfaces and networks based upon status/capability information and decision making rules that span multiple communication media associated with distinct networks/interfaces. Thus, decision making with regard to configuring network connections for a set of network interfaces is not limited to network/interface information and rules that consider/contemplate only a single communications medium.

Figure 4:
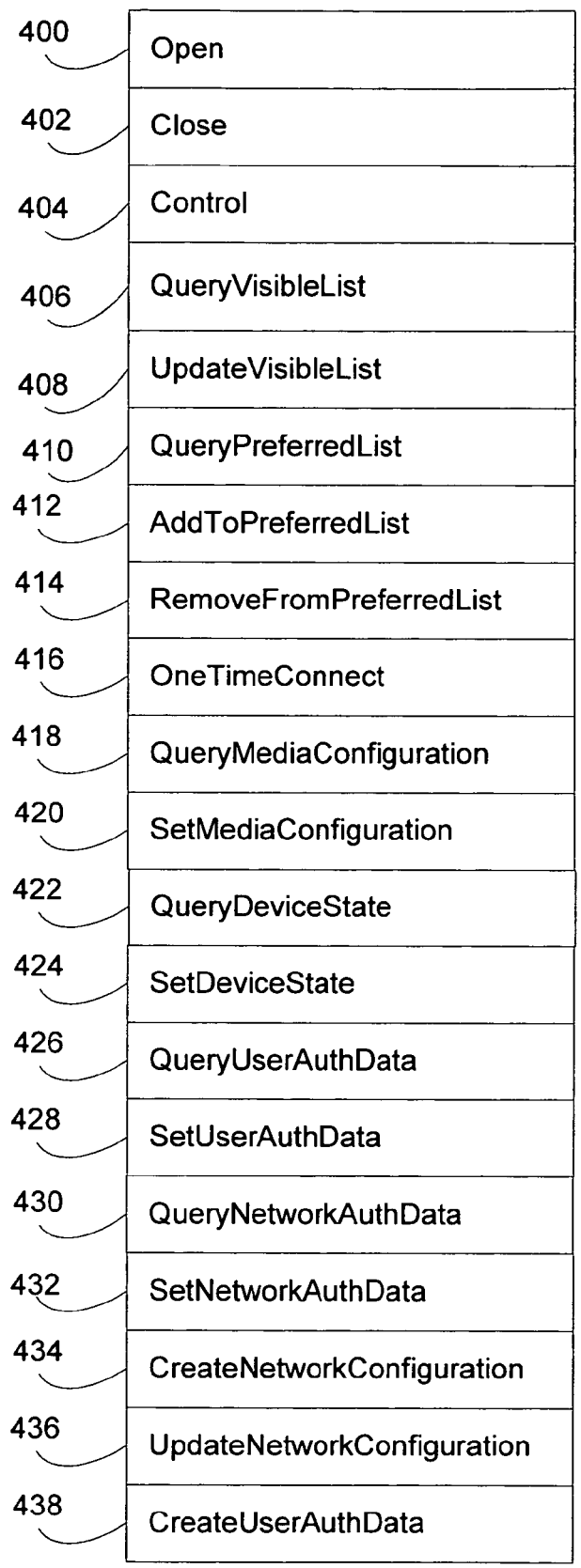
FIG. 4 summarizes an example set of methods are identified for a public interface between a rules engine and a set of applications and user interfaces.

Turning to FIG. 4, an example set of methods are listed for an interface (e.g., the common RPC API 303) between the rules engine 300 and the UI 310, Group Policy Services 312 and Provisioning Services 314. An Open method 400 creates a context handle for a user-mode process accessing the rules engine 300. A Close method 402 receives the handle previously created by the Open method 400 and closes the handle. A Close method 402 abort all pending requests and frees all associated resources in the rules engine 300 associated with the handle previously created to service requests by a caller. A Control method 404 receives as input a handle, GUID, Control code, Input Parameter, and outputs output parameters after executing non-standard functionality (identified by control codes) such as RestartAuthentication, etc.

The set of methods exposed by the rules engine 300 to applications includes a set of methods for accessing/changing a list of available networks. A QueryVisibleList method 406 API enables the caller to request the rules engine 300 to provide a list of available devices/interfaces and their associated networks. An optional input GUID parameter, if specified, results in the query being executed only for that GUID's device, otherwise the call will be executed across all devices across all loaded media specific modules. An UpdateVisibleList method 408 causes a forced scan by the rules engine 300 to refresh the Visible list on either all devices, or if specified a particular device, and the rules engine 300 returns the resulting list of available networks.

The set of methods exposed by the rules engine 300 to applications includes a set of methods for accessing/changing a list of preferred networks. A QueryPreferredList method 410 queries the rules engine 300 for the list of preferred networks. If a GUID or Media Type are specified (by flags or setting values for those fields), then the returned list result is filtered for that GUID and/or Media Type, otherwise a global list will be returned. An AddToPreferredList method 412 is called to add an entry to the preferred list. The AddToPreferredList method 412 potentially fails if the preferred list has been modified from its last state by another caller. A RemoveFromPreferredList method 414 is called to remove an entry from the preferred list. This potentially fails if the preferred list has been modified from its last state by another caller.

A OneTimeConnect method 416 implements a one time connect functionality. In other words, a temporary state is established within the rules engine 300 for a specified entry. The connection is not persisted on any preferred list after the connection is completed.

A set of methods provide access to a current configuration for communication media. A QueryMediaConfiguration method 418 invokes the rules engine 300 to obtain and provide all parameters relating to a current media specific configuration. A SetMediaConfiguration method 420 invokes the rules engine 300 to initiate setting a media specific configuration.

A set of methods provide access to a device-specific configuration. A QueryDeviceState method 422 returns a set of parameters relating to a specified device-specific (e.g., network interface card) configuration. A SetDeviceState method 424 sets parameters associated with a particular device-specific configuration.

A set of methods provide access to authentication data associated with a particular user. A QueryUserAuthData method 426 returns authentication information for a user identified by a specified user authentication token. A SetUserAuthData method 428 sets authentication data corresponding to a specified user authentication token.

A set of methods provide access to authentication data associated with a particular network. A QueryNetworkAuthData method 430 returns network-specific authentication information for a network identified by a specified network authentication token and a provided user handle. A SetNetworkAuthData method 432 sets authentication data corresponding to a specified user authentication token.

The following three methods are supported by the common RPC API 303 of the rules engine for the provisioning services 214. A CreateNetworkConfiguration method 434 is similar to the above-described SetNetworkAuthData method 432; however, a network configuration is supplied in XML format via an input parameter. An UpdateNetworkConfiguration method 436 is similar to the CreateNetworkConfiguration method 434 except that a pre-existing configuration is assumed to exist for the identified network. A CreateUserAuthData method 438 is similar to the SetUserAuthData method 428 except the user data is supplied in a passed parameter in XML format.

Figure 5:
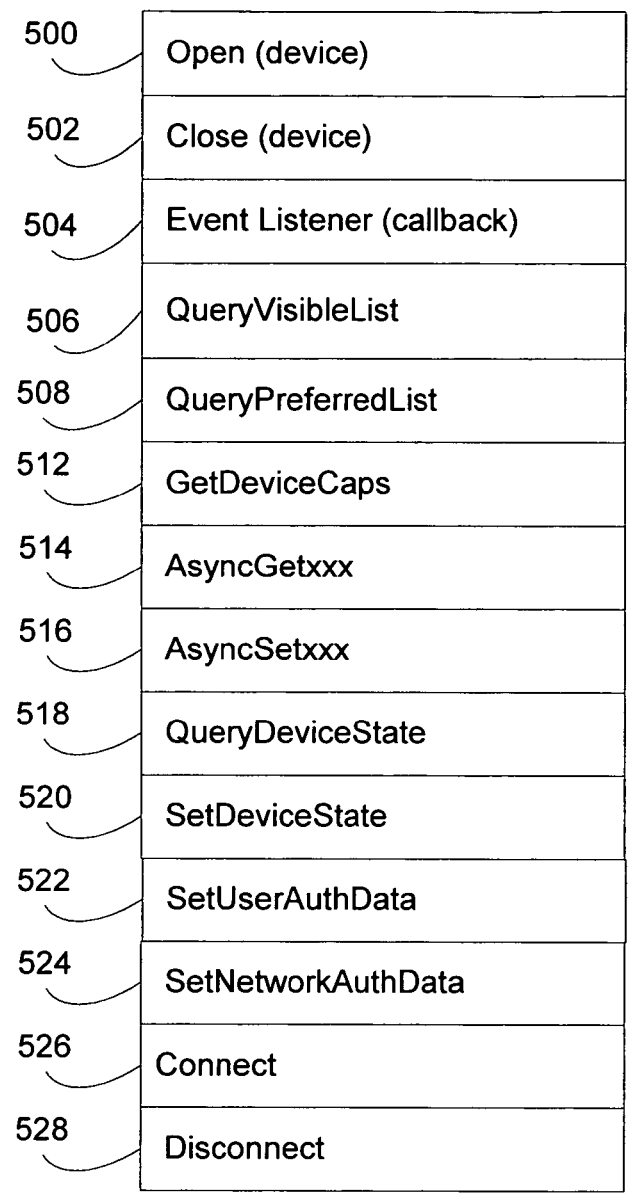
FIG. 5 summarizes an example set of methods for an interface interposed between a rules engine and media specific modules that interact to facilitate selecting and determining a configuration for network interfaces on a computing device supporting a set of network interfaces spanning multiple communication media.

Turning to FIG. 5, an example set of methods are listed that are exposed by an interface provided by the normalization module 303 between the rules engine 300 and media-specific modules 320. The set of methods facilitates querying and configuring the devices (e.g., network interface cards) associated with the media-specific drivers via the media specific modules 320 while avoiding the need to know any media specific implementation requirements (handled by the normalization module 322).

An Open method 500 creates a context handle for the rules engine 300 for a particular identified device/interface. A Close method 502 receives the handle previously created by the Open method 500 and closes the handle. A Close method 502 aborts all pending requests and frees all associated resources in the rules engine 300 associated with the handle previously created to service requests by the rules engine for the particular identified device.

An Event Listener method 504 establishes a callback (notification) reference for the rules engine 300 to receive identified notifications, from the normalization module 322. The Event Listener method 504 receives as input: an event notification code that identifies some event for which the rules engine desires notification, a pointer to the interface source of a notification, a pointer to the data of the notification, and user/context information.

The set of methods exposed by the normalization module 320 to the rules engine 300 includes a QueryVisibleList method 506 API that enables the rules engine 300 to request enumeration of a list of available networks for each device, media, or all devices—as specified by an input GUID parameter. Similarly, a QueryPreferredList method 508 facilitates querying, by the rules engine 300, a list of preferred networks. If a GUID or Media Type are specified (by flags or setting values for those fields), then the returned list result is filtered for that GUID and/or Media Type, otherwise a global list will be returned.

A set of methods provide access to the capabilities and current status of installed devices/interfaces. A GetDeviceCaps method 512 is called by the rules engine 300 to initiate obtaining device capabilities for an interface specified by the handle returned during a previous call to the Open method 500. Examples of such capabilities are described herein below. In addition, the capabilities include device type-specific definitions for the interfaces.

A set of AsyncGetxxx methods 514 and a set of AsynchSetxxx methods 516 facilitate obtaining and setting a variety of device-specific state/status parameters. The AsyncGetxxx methods 514 pass a device/interface handle that was provided for a device in response to the Open method 500. The AsyncGetxxx methods 514 also include an phAsync input/output parameter whereby the rules engine 300 passes in a pointer to a user context value for asynchronous notifications. The output returned via the phAsync parameter is a pointer to an asynchronous notification handle. The handle is subsequently used to access the retrieved information. Examples of the types of Getxxx methods 514 include: online/offline status, signal state, visible providers/networks, preferred providers, ready state, registration state, etc.

The AsynchSetxxx methods 516 pass a device/interface handle, a pointer to data to be provided for performing the particular set functionality, and a pointer to a user context handle for a returned notification. Upon completion, the pointer references a handle for the request. The pointer to the user context value/output handle is used as a notification mechanism to the rules engine 300 to signal completion or failure of the requested set function. The types of AsynchSetxxx methods 516 include for example instructions affecting the online/offline and connection status of the specified device/interface.

It is further noted that in embodiments a QueryDeviceState method 518 and a SetDeviceState method 520, generalized methods for determining the state of an interface and setting the state of an interface (corresponding to the QueryDeviceState method 422 and SetDeviceState method 424, respectively) are also supported in the normalization module 322 or any other suitable interface interposed between the rules engine 300 and the media specific modules 320.

The interface supported by the normalization module 322 also includes a SetUserAuthData method 522 and a SetNetworkAuthData method 524 corresponding in function to the SetUserAuthData method 428 and the SetNetworkAuthData method 432.

The rules engine 300, in carrying out a network interface configuration selection, submits instructions to establish/break connections via a connect method 526 and a disconnect method 528. The connect method 526 receives, by way of example, a network name (e.g., SSID for WLAN or Provider and APN for WWAN), logon/authentication information, a Pin (for WWAN), etc.

It is noted that, having described an example set of interfaces incorporated into an illustrative embodiment, alternative embodiments are contemplated wherein the interfaces include differing call sets for facilitating acquiring information about, and configuring, network interfaces in accordance with the operation of a configuration selection rules engine/system as described, by way of example, herein.

Figure 6:
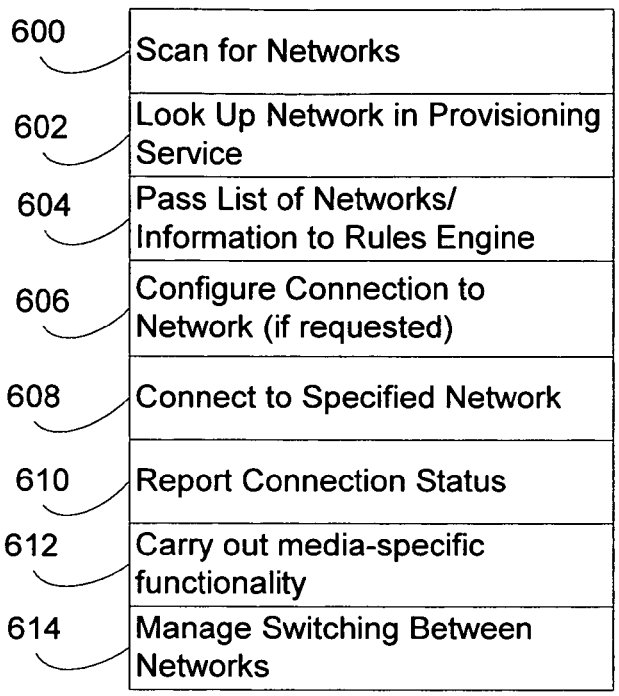
FIG. 6 summarizes a set of states of a state machine implemented for each of a set of media specific modules.

The functionality of the media specific modules can be carried out in a variety of ways. Turning to FIG. 6, a set of states are identified for a state machine implemented by the rules engine 300 (or alternatively the normalization module 322) for each one of the set of media specific modules 320 in accordance with an example embodiment of the modules 320. In a simplest form, the set of states are sequentially executed. If a particular state is reached within the sequence and the associated action is not required, then the associated action is skipped until at least a next iteration of the sequence. However, in alternative embodiments, the transitions between states are driven by state variables and can potentially occur in a non-sequential order, and will not necessarily follow the order of presentation in FIG. 6. During a scan for networks state 600 a media specific module is called upon to query installed media specific drivers having a same media type for the status/capabilities information relating to each connected network. In the event that a network is associated with a provisioning service, during a look up network in provisioning service state 602 the media specific module issues a query, via the rules engine 300, to a provisioning service for media-specific network information. After accumulating one or more sets of network interface information, during a list passing state 604 the media specific module provides a list containing a set of network description data structures (see, FIG. 7) associated with the media specific module type.

Upon receiving a call by the rules engine 300 to configure a particular network interface, a configure connection state 606 of the state machine issues connection configuration instructions to a particular media specific driver corresponding to the network interface identified in the call from the rules engine 300. In the case where a new connection is to be established based upon a request from the rules engine 300, after configuring a network interface at state 606, at connect to network state 608 the media specific module issues instructions to the media specific driver associated with the selected network and interface to establish an operational layer two (data-link) connection between the network interface and the identified network. During a report status state 610 the media specific state machine queries the driver and retrieves current connection status information for the specific network interface card (NIC) and thereafter presents the information to the rules engine 300.

A media specific functionality state 612 is a general state that is programmed according to the particular needs of a media with which a media specific state machine is associated. A manage network switching state 614 handles instances where a first network connection is discontinued and another one takes its place. The content/functionality of the manage network switching state 614 depends largely upon the particular media with which the media specific state machine is associated. In an embodiment, the switching operation is driven by the rules engine 300 through appropriate connect/disconnect instructions. However, in alternative embodiments the switching operation is driven at lower levels by, for example, the normalization module 322.

Figure 7:
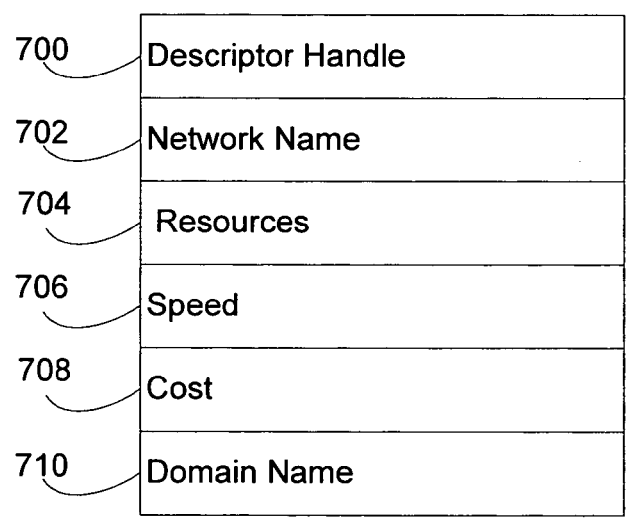
FIG. 7 summarizes a set of fields within example network interface information passed by media specific modules to a rules engine in response to a capabilities query by the rules engine.

Turning briefly to FIG. 7 a set of fields associated with an example network interface descriptor data structure is provided. The network interface descriptor is provided by media specific modules 320 to the rules engine 300 to facilitate network and interface selection across potentially multiple communication media. A single media specific module, responsible for scanning multiple network interfaces for a particular medium, supplies a list of such descriptors corresponding to each of the scanned network interfaces. The rules engine 300 accumulates the network interface descriptors provided by the set of media specific modules and applies a network and interface selection criteria to the accumulated descriptors. Thereafter, the rules engine 300, upon selecting a network/interface combination, specifies configuration instructions to the media specific modules 320 to implement the network/interface selection. The media specific modules 320 thereafter carry out the configuration instructions to connect to (or disconnect from) a specified network associated with a particular network interface.

In an example network interface descriptor, a descriptor handle field 700 stores a unique identification assigned to a particular instance of a descriptor for a network interface. The handle value provides a reference for a particular instance of the combination of status/capability information described herein below for a particular network interface. A network name field 702 stores a value uniquely identifying a network with which the network interface is associated. A resources field 704 generally identifies a network resource accessed via the network interface. The resource field 704 supports rules-based network and interface selection that is based upon a need to access a particular resource such as a corporate LAN, the Internet, etc. A speed field 706 stores a value indicating the maximum data rate currently supported by the particular network interface. A cost field 708 is used to specify a cost associated with using the particular network. The cost field 708, in a simplest case, merely states whether or not the network connection does not incur a cost on a per use basis. Alternatively, cost can be a weighted number used to compare the relative cost associated with particular ones of multiple networks. The cost field 708 supports rules-based decision making where cost is a factor when deciding whether or not to select a particular network interface (over other available network interfaces) for establishing a connection. A domain name field 710 specifies an optional domain name (e.g., Microsoft.com) It is noted that the present embodiment contemplates a broad spectrum of network interface description formats and thus the above-described example should not be construed as limiting the various embodiments. The above set of descriptor fields is intended to be example. Other potentially used fields include: wireless/wired media type, sub-types of a particular wireless media type (e.g. 802.11 a/b/g subtypes for WLAN media), authentication mode, encryption mode, etc.

The following is an example of an accumulated set of network interface descriptors provided to the rules engine 300 by the 802.11 media specific module and the WWAN module. The first three descriptors were provided by the 802.11 module, the last descriptor was provided by the WWAN module. It is noted that a descriptor can specify a set of resources—as shown, by way of example, in the third descriptor identified by the handle "GUID3."

{GUID1}; SSID1; Internet; 11 Mbps; free; wisp2.com
{GUID2}; SSID1; Internet; 11 Mbps; free; wisp1.com {GUID3}; SSID2; Internet, corporate; 11 Mbps; free; microsoft.com {GUID4}; APN1; Internet; 384 kbps; free; wisp1.com Having described a general framework for a rules engine based automatic network connection configuration facility embodying the present embodiment, attention is directed to a table set forth in FIG. 8 that contains a set of example network and interface selection scenarios that span multiple communication media. Such criteria are implemented by the rules engine 300 based upon network interface descriptors of the type described, by way of example, above.

In a first scenario set forth in the first row of the table, a rule applied by the rules engine 300 specifies one media over one or more others. Specific scenario examples include specifying: a media type (e.g., WLAN over WWAN), highest data transmission rate, a sub-type of media (e.g., 802.11a over 802.11b). Parameters used in such a rule scenario include: link speed, physical media (wire/wireless), 802.11 type (a/b/g), and cost.

In a second scenario set forth in the second row of the table, a rule applied by the rules engine 300 specifies one network over one or more others. A specific scenario example is specifying a corporate LAN over a public wireless LAN network provided by a wireless internet service provider (WISP). Parameters used in such a rule scenario include network identifier types (e.g., SSID for WLAN and APN for WISP).

In a third scenario set forth in the third row of the table, a rule applied by the rules engine 300 specifies a network preference order based upon current location. Specific scenario examples include specifying: WISP A over WISP B in the United States and WISP B over WISP A when located in Europe. A parameter used in such a rule scenario is location (e.g., home, work, physical location, etc.).

In yet another scenario, provided in the fourth row of the table, a rule applied by the rules engine 300 specifies a preference order comprising logical networks. A specific scenario example includes specifying: a corporate network over WISP A over WISP B. A network provider decides which physical network (WLAN over WWAN) to use based upon XML provisioning. Parameters used in such a rule scenario include: XML provisioning files from a wireless provider, business logic to facilitate dynamic network and interface selection.

In still yet another scenario, preferences are designated based upon a time of day. In instances where certain networks/interfaces are preferred based upon the time of day, a preference can be implemented based upon the currently detected time. For example, if a particular WWAN network provider is preferred on nights and weekends while another provider is preferred during weekdays, then a rule is submitted to, and applied by, the rules engine 300 to render a configuration selection (comprising a combination of a designated network and interface for establishing a connection to the network).

In general, the rules engine accesses rules to decide networks to select associated with potentially multiple media types. The rules are specified through a user interface (e.g., a dialog that accompanies the launch of a particular application or service), a group policy specified by an administrator, or a network provisioning service. These rules can be either one, or a combination, of:

rules a user specified for establishing a network connection (e.g., user specifies WLAN media over WWAN media).

a preference order specified by a network service provider. Depending on the rules in operation, the rules engine can specify network connections on each available media, or can specify network connections on one media type only and block connections on others.

the rules a network provider provisioned, if the user elects to defer to the network provider (example: WISP1 is the most-preferred network provider but is available via multiple media. WISP1 decides which physical network to use to connect).

Figure 9:
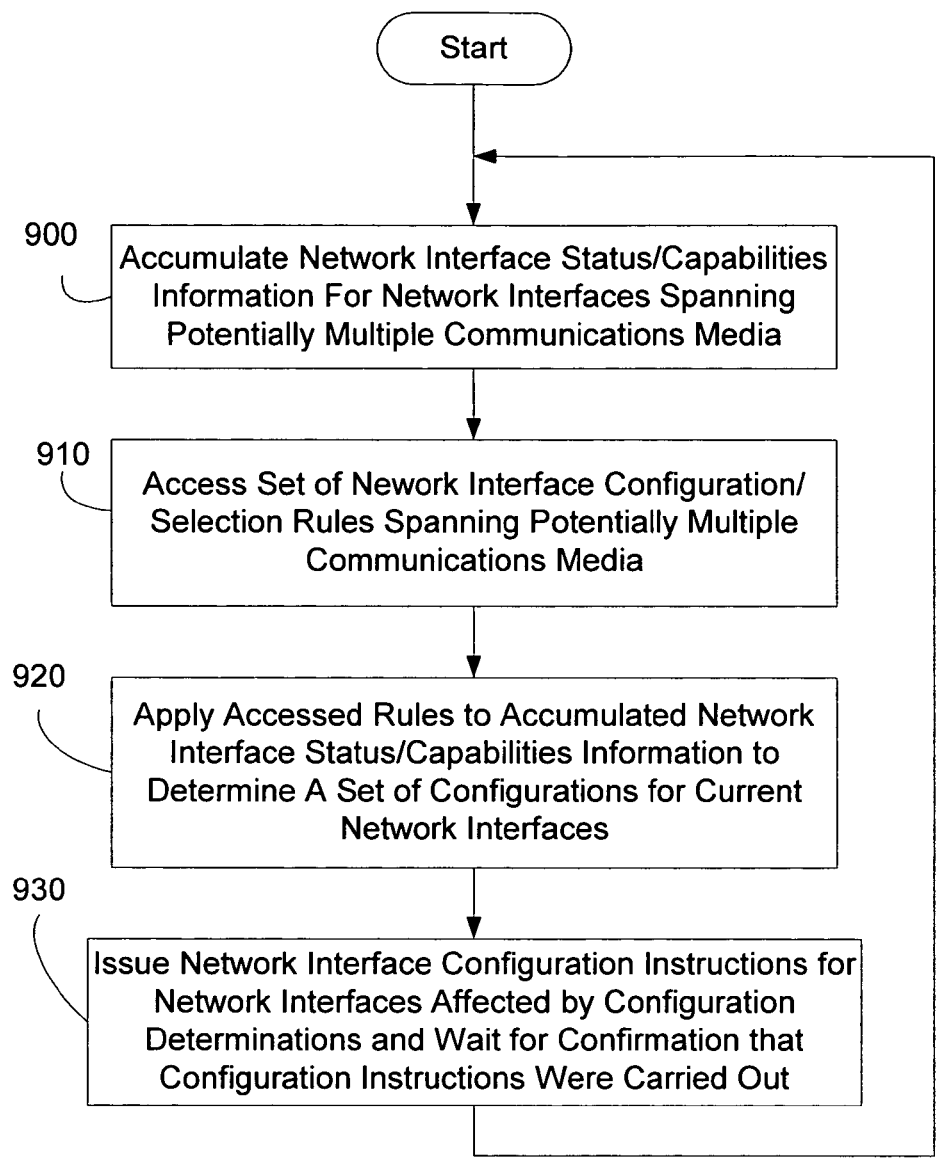
FIG. 9 is a flowchart summarizing an example set of steps for carrying out network and interface selection using the network interface selection architecture depicted in FIG. 3.

Turning to FIG. 9, a flowchart summarizes an example set of steps for carrying out wireless media configuration using the configuration architecture depicted in FIG. 3. The operation of the rules engine applying a current set of network and interface selection rules to a current set of available devices and associated networks can be initiated under a variety of conditions. For example, if a scan of all devices is performed that returns a new device state (e.g., a new network is available), upon receiving a notification from the data link layer services module 324 that an interface has been added/removed, a new rule or set of rules is specified, a connection was broken, a network/logical location changed, policy or provisioning changes have occurred, etc.

As a preliminary step to performing network and interface selection, during step 900 the rules engine 300 receives status/capability information arising from the set of network interfaces across multiple communication media (e.g., a WWAN interface and a WLAN interface). Such information is provided to the rules engine 300, by way of example, in a standardized format by one or more of the media specific modules 320 via the normalization module 322. In the case of a new device arrival, as an initial preliminary step, the rules engine 300 requests the data link layer services module 324 to load an associated media specific module (if not already loaded) and passes back appropriate references to the media specific module.

The status/capability information is accumulated/updated by the rules engine 300 in a variety of ways. In the illustrative embodiment, the information is acquired by the rules engine 300 by actively querying (polling) the media specific modules 320 in accordance with a scanning algorithm described, by way of example, herein below, as well as receiving unsolicited updates of the status/capabilities of network interfaces from the modules 320 that receive data from media drivers that potentially execute there own versions of a scanning algorithm.

The media specific modules 320, in turn, obtain the network interface status/capability information from the media specific drivers 302 in any suitable manner including either or both push and pull data acquisition procedures. In an embodiment, wireless media specific modules (either on their own initiative or in response to an asynchronous request from another entity associated with network interface configuration) pull the information from the drivers 302 based upon scanning algorithms that are formulated to take into account a variety of factors including: current power source (e.g., battery), current connection state (wired/wireless), duration of current connection, whether the computing device is presently moving, etc. In a particular wireless scanning arrangement, a scanning engine associated with a wireless media specific module applies a scanning algorithm based upon a set of scanning parameters including historical information maintained within a scanning history table to determine when to commence a next scan cycle for a network interface (or set of network interfaces). When the time for a next scanning period arrives, the media specific module commences scanning the affected network interfaces and stores the scan results.

During step 910 the rules engine 300 accesses a set of rules specified by either one or a combination of rules sources including: the user interface 310, group policy services 312 and the provisioning services 314. In the example embodiment, the rules engine 300 retrieves the network interface configuration rules from the dynamic rules data store 304. As mentioned previously above, the rules potentially encompass multiple media.

Periodically or upon asynchronous request, at step 920 the rules engine 300 applies the network and interface selection rules, accessed during step 910 and spanning potentially multiple communications media, to the received information to select one or more network interfaces for connecting to one or more particular networks and render configuration instructions for each of the set of network interfaces corresponding to the set of media specific drivers 302 for the selected interface/network combinations. Selecting a particular network for a network interface is needed in situations where a single network interface, such as a wireless LAN transceiver, is capable of accessing multiple networks.

Thereafter at step 930, the rules engine 300 issues configuration commands to the media specific drivers 302 via the media specific modules 320. In the case where a network interface status is unchanged by the results of step 920, there is no need to issue a configuration command. However, in cases where status does change for a particular network interface, the rules engine 300 issues an appropriate configuration instruction to a corresponding media specific module to carry out the change and waits for confirmation by the media specific module that the instruction has been carried out.

Having described an example set of steps for carrying out network interface configuration decision-making across multiple media, it is noted that the above steps are merely example. As those skilled in the art will appreciate in view of the disclosure contained herein, the individual steps are intended to show a progression of data/processing flow that results in set of configuration instructions issued by the rules engine to appropriate ones of the media specific modules 320. Thus, by way of example, the acquisition of network interface information can occur while the rules engine is obtaining the configuration rules that are to be applied to the network interface information.

Figure 10:
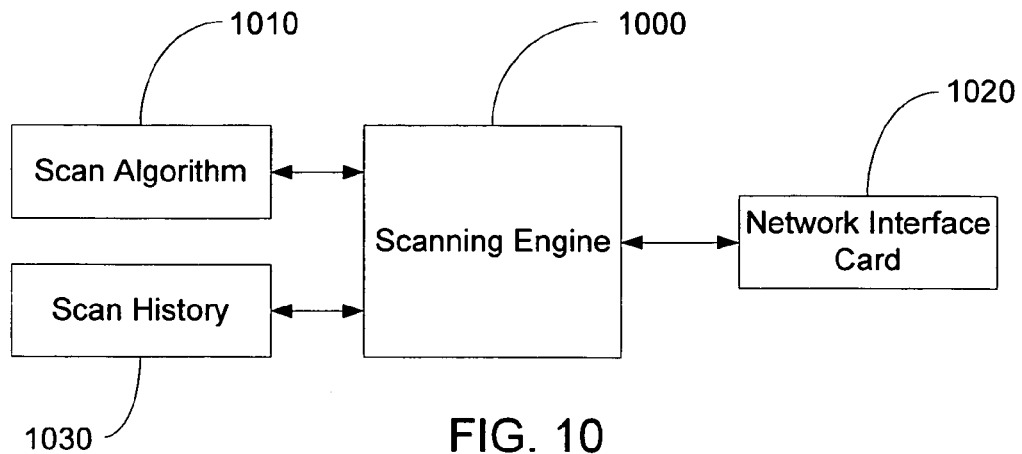
FIG. 10 is an example scanning engine architecture for controlling scanning by network interfaces to facilitate reducing battery power consumption on a mobile computing device.
Figure 11:
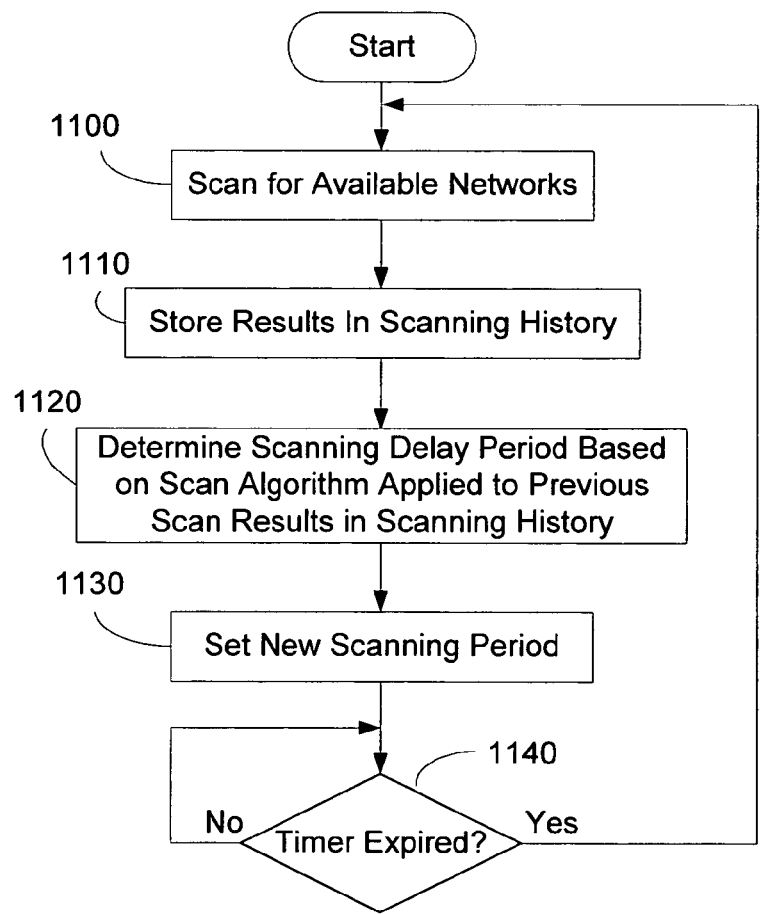
FIG. 11 is an example set of steps of a scanning scheme incorporated into the scanning architecture identified in FIG. 10.

Turning now to FIGS. 10 and 11, scanning for wireless networks is performed periodically by wireless network interface cards in support of the above-described network and interface selection architecture/method described herein above—even when a user has no intention/need to connect to any networks sensed by the wireless NICs. A wireless network scanning engine 1000 operating under the control of a scan algorithm 1010 described herein below varies scanning frequency of a wireless NIC 1020 based on a current state of a wireless NIC as evidenced by information stored in a scan history 1030.

In summary of a general scanning algorithm implemented by the scanning engine 1000, when the wireless NIC 1020 is not associated with a wireless network, and has not been associated for a significant period, scanning frequency is reduced. Additionally, when the NIC 1020 has been associated with the same access point for a significant period of time with good signal strength, scanning frequency is again reduced because the client application relying upon the wireless connection associated with the NIC is less likely to need to roam/switch to another access point or network. This is especially true if a laptop or other battery powered computing device containing the NIC 1020 is not actively transmitting data packets. Reducing the scanning frequency, in accordance with the above scanning algorithm, conserves laptop battery power as the card can be powered down for longer periods of time between scans.

Referring now to FIG. 11, a set of steps are depicted for a repeating sequence of steps governing the operation of the scanning engine. Initially, during step 1100, the scanning engine invokes the NIC 1020 (e.g., a WLAN NIC) to scan for available networks in a known manner and the resulting information is stored in the scan history 1030. During step 1110 the results are also stored in a network interface driver associated with the NIC 1020 (and later passed up to a corresponding media specific module). Thereafter, during step 1120 the scanning engine 1000 determines a scanning delay period based, at least in part, upon a scanning algorithm 1010 (described further below) and previously stored scanning results in the scan history 1030. Thereafter, at step 1130 a scan delay period is set for performing a next scan of the NIC 1020. Thereafter, control passes to a wait stage 1140 until the delay time period expires and control returns to step 1100 and a next scan is performed.

Having described an example scan procedure, a general scan control scheme is described herein below. Initially, the power mode of the computing device will govern whether to enable the scan timing algorithm. By way of example, the scan timing algorithm is implemented when the computer is on battery power and the NIC is not in continuous access mode.

Scanning is intended to ensure that a computing device can roam successfully. By scanning regularly, the computing device should not be able to move too far from the currently associated access point without associating with another access point (roaming). In accordance with various embodiments store responses to previous scans so that it can adaptively tune the scanning period. The scanning scheme addresses the following cases:

1. When there is no network visible or the user fails to associate to a particular network.

2. When the laptop has been associated to the same access point for a significant length of time and the signal strength is still sufficient. This indicates that the user is not moving and it is not necessary to scan for other networks or access points.

3. When the user laptop is physically moving so that it can perform a scan for available networks before the user moves out of range of an access point.

In cases 1 and 2, the interval between scans can be significantly longer than 60 seconds. The scanner timing scheme is implemented to increase the interval between scans to a set maximum based on the history of previous scans. The maximum is implemented as a failsafe device to prevent a complete shut down of the scanning procedure when there is no change in state.

In case 3, if it can be detected that the laptop has moved, then the scanning engine 1000 performs a scan to check for available networks or access points as it is possible that the user can move out of range of the current network. Movement can be detected either in a location awareness module or through, in the case of an 802.11 NIC, analysis of 802.11 statistics, such as received signal strength, retransmission counts and frame error rates In accordance with an example scanning scheme, the computing device also detects when there is another NIC providing network access (such as through an Ethernet cable). In this case, all scanning on the wireless NIC is wasted power and the NIC should be disabled. Even if the NIC remains enabled, it should not be requested to perform scanning.

Furthermore, the scanning engine will detect when the NIC is actively sending traffic. This is an improper time to perform a scan and any scheduled scan should be delayed until traffic is sent. If the traffic is sent and the statistics are sufficiently good, a scanning period is skipped. Finally, with regard to an example scanning control scheme, the user might want to request a scan before the next scanning interval arrives. The NIC will perform this scan on demand and adjust the scanning history, period, timer, and frequency accordingly.

It will be appreciated by those skilled in the art that a new and useful method and framework for facilitating/performing automated configuration/selection of network access has been described herein. More particularly, the rules-based network and interface selection architecture described herein facilitates automated selection of a particular mode of network access based upon status information provided by a set of media specific modules associated with multiple communication media. In view of the many possible computing environments to which the described principles may be applied and the flexibility of carrying out automated network access configuration, it should be recognized that the embodiment described herein is meant to be illustrative and should not be taken as limiting the scope of the claimed subject matter. Those skilled in the art will appreciate that the illustrative embodiment can be modified in arrangement and detail without departing from the spirit of the claimed subject matter. Therefore, the embodiments as described herein contemplate all such embodiments as may come within the scope of the following claims and equivalents thereof.

What is claimed is:

1. A system comprising:
   a plurality of media specific drivers individual ones of which being associated with individual, respective network interface cards, individual media specific drivers being configured to obtain network interface status/capabilities information from individual associated network interface cards;
   a rules engine configured to:
      obtain the network interface status/capabilities information from the individual media specific drivers,
      cause the network interface status/capabilities information to be stored in a rule store,
      access network and interface selection rules spanning multiple communication media from the rule store,
      apply an order of precedence to sources of rules, and
      apply a set of selection rules to accumulated network interface status/capabilities information to make network and interface selection decisions;
   an application program interface configured to enable access to the network interface status/capabilities information to one or more applications, one or more provisioning services, one or more group-policy services, or a user interface;
   a set of media specific modules configured to support automatic network and interface selection, under the influence of the rules engine, relating to particular media types, individual media specific modules being configured to receive, from the rules engine, network interface configuration commands to connect to a particular network or networks; and
   a media specific module interface configured to enable communication between the media specific modules and the rules engine, the media specific module interface including a normalization module to facilitate communication standardization between the rules engine and different types of the media specific modules.

2. The system of claim 1, wherein the application program interface is callable for querying and changing one or more of: preference lists, visible lists, media configurations, device states, user authentication data, or network configuration.

3. The system of claim 1, wherein the order of precedence favors rules provided by group-policy services over rules provided by the user interface.

4. The system of claim 1, wherein the network and interface selection rules are based upon one or more of the following parameters: resource, speed, network provider service preference order, cost, power consumption, or location.

5. The system of claim 1, wherein the set of media specific modules comprises at least: a LAN module, a WLAN module, a WWAN module, and a personal area network.

6. The system of claim 1, wherein individual media specific modules of the set of media specific modules are configured to request network interface status/capabilities information from individual respective media specific drivers, on behalf of the rules engine.

7. The system of claim 6, wherein the individual media specific modules are configured to invoke scanning of network interfaces by associated media specific drivers of a supported media type.

8. The system of claim 6, wherein the individual media specific modules are configured to pass the network interface status/capabilities information to the rules engine.

9. The system of claim 1, wherein each of the media specific modules incorporates a state machine for carrying out connectivity functionality.

10. The system of claim 1, wherein the normalization module is configured to provide driver capabilities/status information from the media specific modules to the rules engine.

11. The system of claim 1, wherein the normalization module is configured to facilitate specification, by the rules engine, of network interface configuration commands to the media specific drivers.

12. The system of claim 1, wherein the normalization module is configured to: provide driver capabilities/status information from the media specific modules to the rules engine; and facilitate specification, by the rules engine, of network interface configuration commands to the media specific drivers.

13. The system of claim 1, wherein the media specific modules comprise user mode modules.

14. The system of claim 1, wherein the media specific drivers comprise kernel mode drivers.

15. The system of claim 1, wherein the set of media specific modules is extensible.

16. The system of claim 1, wherein individual media specific modules are loadable and un-loadable as needed to accommodate installed network interfaces/drivers.

17. The system of claim 1, wherein the rules engine is configured to register with a notification service that monitors installation/removal of devices from an associated computing device.

18. The system of claim 1, wherein the rules engine is configured to receive a notification from the notification service that the new network interface/device has been installed and make a determination whether to load a media specific module to handle a media type of the new network interface/device.

19. A method for selecting a network and interface combination, to which a computing system will initiate a connection via the network interface, the method comprising:
   accumulating network interface information spanning multiple communication media, the accumulated network interface information being associated with a set of networks and a set of network interfaces, each network interface for connecting the computing system to a network in the set of networks;
   designating one of the set of networks by applying a network selection criterion to the accumulated network interface information;

acquiring network interface information pertaining to network interfaces associated with particular media types, the network interface information acquired from media specific drivers associated with particular interfaces;

receiving network interface configuration commands to connect to one of the set of networks;

converting standardized communication requests into media specific communications that meet media specific implementation requirements; and directing the media specific communications to respective network interfaces.

20. A method comprising:

using a plurality of media specific drivers to obtain network interface status/capabilities information from individual, respective associated network interface cards;

operating a rules engine to:
- obtain the network interface status/capabilities information from the individual media specific drivers,
- cause the network interface status/capabilities information to be stored in a rule store,
- access network and interface selection rules spanning multiple communication media from the rule store,
- apply an order of precedence to sources of rules, and
- apply a set of selection rules to accumulated network interface status/capabilities information to make network and interface selection decisions;

using an application program interface to enable access to the network interface status/capabilities information to one or more applications, one or more provisioning services, one or more group-policy services, or a user interface;

operating a set of media specific modules to support automatic network and interface selection, under the influence of the rules engine, relating to particular media types, individual media specific modules being configured to receive, from the rules engine, network interface configuration commands to connect to a particular network or networks; and operating a media specific module interface to enable communication between the media specific modules and the rules engine, the media specific module interface including a normalization module to facilitate communication standardization between the rules engine and different types of the media specific modules.

* * * * *